(12) United States Patent
Ueda et al.

(10) Patent No.: US 9,796,846 B2
(45) Date of Patent: *Oct. 24, 2017

(54) RESIN COMPOSITION AND RESIN MOLDED OBJECT

(71) Applicant: Sony Corporation, Tokyo (JP)

(72) Inventors: Kenji Ueda, Kanagawa (JP); Yasuhito Inagaki, Kanagawa (JP); Takahiro Ohe, Tokyo (JP); Atsushi Yamada, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/422,391

(22) PCT Filed: Jun. 12, 2013

(86) PCT No.: PCT/JP2013/003691
§ 371 (c)(1),
(2) Date: Feb. 19, 2015

(87) PCT Pub. No.: WO2014/033987
PCT Pub. Date: Mar. 6, 2014

(65) Prior Publication Data
US 2015/0218370 A1 Aug. 6, 2015

(30) Foreign Application Priority Data
Aug. 31, 2012 (JP) ................................. 2012-192672

(51) Int. Cl.
C08L 69/00 (2006.01)
(52) U.S. Cl.
CPC ........... *C08L 69/00* (2013.01); *C08L 2201/02* (2013.01)

(58) Field of Classification Search
CPC ..... C08L 69/00; C08L 2201/02; C08K 3/346; C08K 5/42
See application file for complete search history.

(56) References Cited

U.S. PATENT DOCUMENTS

| | | | |
|---|---|---|---|
| 2003/0199631 A1* | 10/2003 | Itagaki | C08L 69/00 524/588 |
| 2007/0179233 A1 | 8/2007 | Isozaki et al. | |
| 2011/0306712 A1* | 12/2011 | Inagaki | 524/165 |

FOREIGN PATENT DOCUMENTS

| | | |
|---|---|---|
| JP | 2004-143410 | 5/2004 |
| JP | 2005-054085 | 3/2005 |

(Continued)

OTHER PUBLICATIONS

Machine translation of JP 2012-122013. Jun. 2012.*

(Continued)

*Primary Examiner* — John Uselding
(74) *Attorney, Agent, or Firm* — K&L Gates LLP

(57) ABSTRACT

A halogen-free type polycarbonate resin composition and a resin molded object having good flame retardant properties and physical properties that make them suitable for the use as manufactured products are provided. A resin composition of the present disclosure includes a component A, a component B, a component C and a component D. The component A is a polycarbonate resin. The component B is talc having an average median diameter of 4.6 μm or more and 6.0 μm or less, whose content is 5% or more and 20% or less by weight. The component C is an organic sulfonic acid or an organic sulfonic acid metal salt, whose content is 0.05% or more and 2.0% or less by weight. The component D is a drip inhibitor, whose content is 0.05% or more and 1.0% or less by weight.

9 Claims, 7 Drawing Sheets

(56) References Cited

FOREIGN PATENT DOCUMENTS

| JP | 2005-255724 | | 9/2005 | |
|----|-------------|---|--------|--------------|
| JP | 2006-124517 | | 5/2006 | |
| JP | 2011-184619 | * | 9/2011 | ............ C08L 69/00 |
| JP | 2012-122013 | * | 6/2012 | ............ C08L 67/00 |

OTHER PUBLICATIONS

International Search Report issued in connection with International Patent Application No. PCT/JP2013/003691, dated Jul. 9, 2013. (1 page).

* cited by examiner

| Sample | Construction feature | Hydrogen atom content (%) | | | | | | |
|---|---|---|---|---|---|---|---|---|
| | | About 7 ppm $C_6H_5$- Phenyl group | 6 $CH_2=CH$- Vinyl group | 4.7-5 H- Hydrogen group | 3.5-3.8 $-OCH_3$ Methoxy group | 0.1-0.2 $-CH_3$ Methyl group | 3.2 (0.5-4) H derived from epoxy | total |
| E-1 | Phenyl/methyl/methoxy/ hydrogen type | 51.2 | — | 3.1 | 3.5 | 42.2 | — | 100 |
| E-2 | Phenyl/methyl type | 70.2 | — | — | — | 29.8 | — | 100 |
| E-3 | Methyl/hydrogen type | — | — | 22.1 | — | 77.9 | — | 100 |
| E-4 | Methyl/hydrogen type | — | — | 8.8 | — | 91.2 | — | 100 |
| E-5 | Phenyl/methyl/methoxy/ vinyl type | 46.2 | 9.2 | — | 17.2 | 27.4 | — | 100 |
| E-6 | Phenyl/methyl/methoxy type | 45.9 | — | — | 31.1 | 23.0 | — | 100 |
| E-7 | Dimethyl/diphenyl type | 38.7 | — | — | — | 61.3 | — | 100 |
| E-8 | Epoxy-modified/dimethyl type | — | — | — | — | 94.0 | 6.0 | 100 |

FIG.1

| | | Example 1 | Example 2 | Example 3 | Example 4 | Example 5 | Example 6 | Example 7 |
|---|---|---|---|---|---|---|---|---|
| [Common flame retardant PC/ABS] | TN-7100F | 93.4 | | | | | | 94.4 |
| [Component A] Polycarbonate resin | A-1 | | | | | | | |
| | A-2 | | 93.4 | | | | | |
| | A-3 | | | 93.4 | | | | |
| | A-4 | | | | 53.4 | | | |
| | A-5 | | | | 40 | | | |
| | A-6 | | | | | 18.4 | 83.4 | |
| | A-7 | | | | | 75 | 10 | |
| | <Arithmetic average of weight-average molecular weight (in PS equivalent)> | 45000 | 46000 | 56000 | 46000 | 36000 | 58000 | 45000 |
| [Component B] Talc | B-1 | | | | | | | |
| | B-2 | | | | | | | 5 |
| | B-3 | 6 | 6 | 6 | 6 | 6 | 6 | |
| | B-4 | | | | | | | |
| | B-5 | | | | | | | |
| [Component C] Sulfonic acid compound | C-1 | 0.3 | 0.3 | 0.3 | 0.3 | 0.3 | 0.3 | 0.3 |
| | C-2 | | | | | | | |
| [Component E] Silicone compound | E-1 | | | | | | | |
| | E-2 | | | | | | | |
| | E-3 | | | | | | | |
| [Component D] Drip inhibitor | D-1 | 0.3 | 0.3 | 0.3 | 0.3 | 0.3 | 0.3 | 0.3 |
| [Endpoints] | Flame retardant properties (UL94V); when thickness is 1.0 mm; V-1 or higher is determined as "O"(good) | O:V-0 | O:V-0 | O:V-0 | O:V-0 | O:V-1 | O:V-1 | O:V-0 |
| | Moldability; determined as "O"(good) or "×" (has defective part) | O | O | O | O | O | O | O |
| | Flexural modulus (MPa); 2900MPa or higher is determined as "O"(good) | O:3020 | O:3050 | O:3090 | O:3040 | O:2990 | O:2990 | O:2980 |
| | Durability | O | O | O | O | O | O | O |
| | Overall determination | O | O | O | O | O | O | O |

FIG.3

| | | Example 8 | Example 9 | Example 10 | Example 11 | Example 12 | Example 13 | Example 14 |
|---|---|---|---|---|---|---|---|---|
| [Common flame retardant PC/ABS] | TN-7100F | | | | | | | |
| [Component A] Polycarbonate resin | A-1 | 94.4 | 81.4 | 81.4 | 79.4 | 81.4 | 92.7 | 92.7 |
| | A-2 | | | | | | | |
| | A-3 | | | | | | | |
| | A-4 | | | | | | | |
| | A-5 | | | | | | | |
| | A-6 | | | | | | | |
| | A-7 | | | | | | | |
| | <Arithmetic average of weight-average molecular weight (in PS equivalent)> | 45000 | 45000 | 45000 | 45000 | 45000 | 45000 | 45000 |
| [Component B] Talc | B-1 | | | | | | | |
| | B-2 | | 18 | | | | | |
| | B-3 | 5 | | 18 | | 18 | 6 | 6 |
| | B-4 | | | | 20 | | | |
| | B-5 | | | | | | | |
| [Component C] Sulfonic acid compound | C-1 | 0.3 | 0.3 | 0.3 | 0.3 | 0.3 | 1 | 1 |
| | C-2 | | | | | | | |
| [Component E] Silicone compound | E-1 | | | | | | | |
| | E-2 | | | | | | | |
| | E-3 | | | | | | | |
| [Component D] Drip inhibitor | D-1 | 0.3 | 0.3 | 0.3 | 0.3 | 0.3 | 0.3 | 0.3 |
| [Endpoints] | Flame retardant properties (UL94V); when thickness is 1.0 mm; V-1 or higher is determined as "O"(good) | O:V-0 | O:V-1 | O:V-0 | O:V-0 | O:V-1 | O:V-0 | O:V-1 |
| | Moldability; determined as "O"(good) or "×" (has defective part) | O | O | O | O | O | O | O |
| | Flexural modulus (MPa); 2900MPa or higher is determined as "O"(good) | O:3010 | O:4410 | O:4550 | O:4700 | O:4590 | O:3050 | O:3030 |
| | Durability | O | O | O | O | O | O | O |
| | Overall determination | O | O | O | O | O | O | O |

FIG.4

|  |  | Example 15 | Example 16 | Example 17 | Example 18 | Example 19 |
|---|---|---|---|---|---|---|
| [Common flame retardant PC/ABS] | TN-7100F | 92.2 | 93.65 |  |  |  |
| [Component A] Polycarbonate resin | A-1 |  |  |  |  |  |
|  | A-2 |  |  |  |  |  |
|  | A-3 |  |  |  |  |  |
|  | A-4 |  |  |  |  |  |
|  | A-5 |  |  |  |  |  |
|  | A-6 |  |  | 18.4 | 18.4 | 18.4 |
|  | A-7 |  |  | 75 | 75 | 75 |
|  | <Arithmetic average of weight-average molecular weight (in PS equivalent)> | 45000 | 45000 | 36000 | 36000 | 36000 |
| [Component B] Talc | B-1 |  |  |  |  |  |
|  | B-2 |  |  |  |  |  |
|  | B-3 | 6 | 6 | 5.5 | 5.5 | 5.5 |
|  | B-4 |  |  |  |  |  |
|  | B-5 |  |  |  |  |  |
| [Component C] Sulfonic acid compound | C-1 |  | 0.05 | 0.3 | 0.3 | 0.3 |
|  | C-2 | 1.5 |  |  |  |  |
| [Component E] Silicone compound | E-1 |  |  | 0.5 |  |  |
|  | E-2 |  |  |  | 0.5 |  |
|  | E-3 |  |  |  |  | 0.5 |
| [Component D] Drip inhibitor | D-1 | 0.3 | 0.3 | 0.3 | 0.3 | 0.3 |
| [Endpoints] | Flame retardant properties (UL94V); when thickness is 1.0 mm; V-1 or higher is determined as "O"(good) | O:V-1 | O:V-0 | O:V-0 | O:V-0 | O:V-0 |
|  | Moldability; determined as "O"(good) or "×" (has defective part) | O | O | O | O | O |
|  | Flexural modulus (MPa); 2900MPa or higher is determined as "O"(good) | O:2980 | O:3050 | O:2970 | O:2980 | O:2970 |
|  | Durability | O | O | O | O | O |
|  | Overall determination | O | O | O | O | O |

FIG.5

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| [Common flame retardant PC/ABS] | TN-7100F | 100 |  |  |  |  |  |  |  |
| [Component A] Polycarbonate resin | A-1 |  |  |  |  |  |  |  |  |
|  | A-2 |  | 93.4 |  |  |  |  |  |  |
|  | A-3 |  |  |  |  |  |  |  |  |
|  | A-4 |  |  |  |  |  |  |  |  |
|  | A-5 |  |  | 93.4 |  |  |  |  |  |
|  | A-6 |  |  |  | 93.4 |  |  |  |  |
|  | A-7 |  |  |  |  | 99.4 | 95.4 | 95.4 | 74.4 |
|  | <Arithmetic average of weight-average molecular weight (in PS equivalent)> | No data | 33000 | 32000 | 61000 | 45000 | 45000 | 45000 | 45000 |
| [Component B] Talc | B-1 |  |  |  |  |  |  |  |  |
|  | B-2 |  |  |  |  |  |  |  |  |
|  | B-3 |  | 6 | 6 | 6 |  |  |  |  |
|  | B-4 |  |  |  |  |  | 4 | 4 | 25 |
|  | B-5 |  |  |  |  |  |  |  |  |
| [Component C] Sulfonic acid compound | C-1 |  | 0.3 | 0.3 | 0.3 | 0.3 | 0.3 | 0.3 | 0.3 |
|  | C-2 |  |  |  |  |  |  |  |  |
| [Component E] Silicone compound | E-1 |  |  |  |  |  |  |  |  |
|  | E-2 |  |  |  |  |  |  |  |  |
|  | E-3 |  |  |  |  |  |  |  |  |
| [Component D] Drip inhibitor | D-1 |  | 0.3 | 0.3 | 0.3 | 0.3 | 0.3 | 0.3 | 0.3 |
| [Endpoints] | Flame retardant properties (UL94V); when thickness is 1.0 mm; V-1 or higher is determined as "○"(good) | ○:V-1 | ×:V-failed | ×:V-failed | ○:V-0 | ○:V-1 | ×:V-2 | ○:V-1 | ×:No data |
|  | Moldability; determined as "○"(good) or "×" (has defective part) | ○ | × | × | × | ○ | ○ | ○ | × |
|  | Flexural modulus (MPa); 2900MPa or higher is determined as "○"(good) | ○:3250 | ○:3000 | ○:2980 | ○:2990 | ×:2410 | ×:2740 | ×:2790 | ×:No data |
|  | Durability | × | ○ | ○ | ○ | ○ | ○ | ○ | ×:No data |
|  | Overall determination | × | × | × | × | × | × | × | × |

| | | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| [Common flame retardant PC/ABS] | TN-7100F | | | | | | | | |
| [Component A] Polycarbonate resin | A-1 | 94.4 | 79.4 | 93.4 | 81.4 | 74.4 | 74.4 | 93.67 | 88.7 |
| | A-2 | | | | | | | | |
| | A-3 | | | | | | | | |
| | A-4 | | | | | | | | |
| | A-5 | | | | | | | | |
| | A-6 | | | | | | | | |
| | A-7 | | | | | | | | |
| | <Arithmetic average of weight-average molecular weight (in PS equivalent)> | 45000 | 45000 | 45000 | 45000 | 45000 | 45000 | 45000 | 45000 |
| [Component B] Talc | B-1 | 5 | 20 | | | | | | |
| | B-2 | | | | | 25 | | | |
| | B-3 | | | 6 | | | | | 6 |
| | B-4 | | | | 18 | | | | |
| | B-5 | | | | | | 25 | | |
| [Component C] Sulfonic acid compound | C-1 | 0.3 | 0.3 | 0.3 | 0.3 | 0.3 | 0.3 | | |
| | C-2 | | | | | | | 0.03 | 5 |
| [Component E] Silicone compound | E-1 | | | | | | | | |
| | E-2 | | | | | | | | |
| | E-3 | | | | | | | | |
| [Component D] Drip inhibitor | D-1 | 0.3 | 0.3 | 0.3 | 0.3 | 0.3 | 0.3 | 0.3 | 0.3 |
| [Endpoints] | Flame retardant properties (UL94V); when thickness is 1.0 mm; V-1 or higher is determined as "O"(good) | ×:V-2 | ×:V-failed | O:V-1 | O:V-1 | ×:No data | ×:No data | ×:V-2 | ×:V-failed |
| | Moldability; determined as "O"(good) or "×" (has defective part) | O | O | × | × | × | × | O | × |
| | Flexural modulus (MPa); 2900MPa or higher is determined as "O"(good) | O:2930 | O:4500 | O:2980 | O:4550 | ×:No data | ×:No data | O:3010 | O:3040 |
| | Durability | O | O | O | O | × | ×:No data | O | O |
| | Overall determination | × | × | × | × | × | × | × | × |

RESIN COMPOSITION AND RESIN MOLDED OBJECT

CROSS REFERENCES TO RELATED APPLICATIONS

The present application is a national stage of International Application No. PCT/JP2013/003691 filed on Jun. 12, 2013 and claims priority to Japanese Patent Application No. 2012-192672 filed on Aug. 31, 2012, the disclosure of which is incorporated herein by reference.

BACKGROUND

The present disclosure relates to resin compositions and resin molded objects which have flame retardant properties.

Recently, in various fields including the fields of electric and electronic apparatuses, automotive parts, and others, there are demands for mechanical strength associated with making those products thinner and lighter, and social needs for environment-friendliness associated with dehalogenation. In response to this, a transition from existing commodity bromine-based flame retardant resins, represented by polystyrene (PS) and ABS resin (acrylonitrile-butadiene-styrene resin), to phosphorous-based (phosphoric acid ester compound, etc.) flame retardant polycarbonate (PC) resins or the flame retardant PC/ABS alloys is under way.

However, since the phosphorous-based (phosphoric acid ester, etc.) flame retardant PC resins and the flame retardant PC/ABS alloys have a large amount (a few percent by weight to more than ten percent by weight) of a phosphorous-based flame retardant being added thereto, there are some problems that a gas generation may occur at the time of mold injection and that physical properties of the resin would significantly drop when it is recycled or placed under high-temperature and high-humidity conditions. These problems may all be considered due to that the phosphorous-based flame retardant hydrolyzes the PC component, especially under the high-temperature and high-humidity conditions.

On the other hand, a polycarbonate resin which is substantially free of the above-mentioned halogens such as bromine and phosphorus has also been developed. For example, Patent Documents 1 and 2 disclose a polycarbonate resin composition in which a silicone containing functional groups or this material with an organic alkali metal salt is added thereto as a flame retardant.

Patent Document 1: Japanese Patent Application Laid-open No. 2004-143410
Patent Document 2: Japanese Patent Application Laid-open No. 2005-54085

SUMMARY

Problem to be Solved by the Invention

However, the polycarbonate resin as described in Patent Documents 1 and 2 might not have sufficient flame retardant properties. In addition, regarding the various manufactured products as described above, there is a demand for moldability, durability, strength and chemical stability of the resin. Hence, a halogen-free type polycarbonate resin which needs to have flame retardant properties, the polycarbonate resin being excellent in practicality as a material of manufactured products, is desired.

In view of such circumstances, an object of the present disclosure is to provide a halogen-free type polycarbonate resin composition and a resin molded object having good flame retardant properties and physical properties that make them suitable for the use as manufactured products.

Means for Solving the Problem

In order to achieve the object described above, according to an embodiment of the present disclosure, there is provided a resin composition including a component A, a component B, a component C and a component D.

The component A is a polycarbonate resin.

The component B is talc having an average median diameter of 4.6 μm or more and 6.0 μm or less, the content of the component B being 5% or more and 20% or less by weight.

The component C is an organic sulfonic acid or an organic sulfonic acid metal salt, the content of the component C being 0.05% or more and 2.0% or less by weight.

The component D is a drip inhibitor, the content of the component D being 0.05% or more and 1.0% or less by weight.

With this configuration, it becomes possible to provide a resin composition having both flame retardant properties and physical properties that make it suitable for the use as manufactured products (moldability, durability, strength and chemical stability). In particular, regarding the talc of the component B, the present inventors have discovered that the grain size (average median diameter) of the talc may have an effect on the retardant properties of the resin composition. By using the talc having the average median diameter described above as the component B, the resin composition that contains the component B would show high flame retardant properties. Moreover, this resin composition substantially does not contain halogen elements, and this would have less impact on environment.

The resin composition may further include a component E. The component E is a silicone compound. Among hydrogen atoms in the silicone compound, the proportion of the hydrogen atoms in phenyl groups may be 51% or more; and/or the proportion of the hydrogen atoms in hydrogen groups may be 22% or more. The content of the component E may be 0.1% or more and 2.0% or less by weight.

With this configuration, in addition to the effect of enhancing the flame retardant properties by the component B, it is possible to further enhance the flame retardant properties by the component E; and the silicone compound under the above-described conditions (proportion of hydrogen atoms) may be especially effective. Further, it may also have an effect of enhancing stiffness of the resin composition by the component B.

The component A may be a polycarbonate resin having 36000 or more and 58000 or less of weight-average molecular weight in polystyrene equivalent.

With this configuration, it becomes possible to make the moldability and strength of the resin composition suitable to be processed (especially for thin-wall processing); and also possible to prevent a drop in flame retardant properties which is due to the component A (occurrence of dripping (melt dripping), etc.).

The component C may be a sulfonic acid of a high molecular polymer having an aromatic ring or a sulfonic acid metal salt of a high molecular polymer having an aromatic ring.

The component C may enhance the flame retardant properties of the resin composition with the component B. By using a sulfonic acid of a high molecular polymer having an aromatic ring or by using a metal salt thereof as the component C, it becomes possible to provide the resin composition with good chemical stability under high-temperature and high-humidity conditions.

The component D may be a polytetrafluoroethylene having fibril-forming abilities.

The polytetrafluoroethylene having fibril-forming abilities may be suitably used as the drip inhibitor. Thus, it becomes possible to prevent a drop in flame retardant properties which is due to dripping of the resin composition.

In order to achieve the object described above, according to another embodiment of the present disclosure, there is provided a resin composition including a component A, a component B, a component C and a component D.

The component A is a component A which is a polycarbonate resin.

The component B is talc having an average median diameter of 4.6 µm or more and 6.0 µm or less.

The component C is an organic sulfonic acid or an organic sulfonic acid metal salt.

The component D is a drip inhibitor.

In order to achieve the object described above, according to still another embodiment of the present disclosure, there is provided a resin molded object including a component A, a component B, a component C and a component D.

The component A is a polycarbonate resin.

The component B is talc having an average median diameter of 4.6 µm or more and 6.0 µm or less, the content of the component B being 5% or more and 20% or less by weight.

The component C is an organic sulfonic acid or an organic sulfonic acid metal salt, the content of the component C being 0.05% or more and 2.0% or less by weight.

The component D is a drip inhibitor, the content of the component D being 0.05% or more and 1.0% or less by weight.

Effects of the Invention

As described above, according to the present disclosure, it makes it possible to provide the halogen-free type polycarbonate resin composition and the resin molded object having good flame retardant properties and physical properties that make them suitable for the use as manufactured products.

Additional features and advantages are described herein, and will be apparent from the following Detailed Description and the figures.

BRIEF DESCRIPTION OF THE FIGURES

FIG. 1 A table showing the proportion of hydrogen atoms in each functional group in components E to be contained in a resin composition of an embodiment of the present disclosure and that of a comparative example.

FIG. 3 A table showing composition of each resin composition of the embodiments of the present disclosure and a result of characterization thereof.

FIG. 4 A table showing composition of each resin composition of the embodiments of the present disclosure and a result of characterization thereof.

FIG. 5 A table showing composition of each resin composition of the embodiments of the present disclosure and a result of characterization thereof.

FIG. 6 A table showing composition of each resin composition of Comparative Examples and a result of characterization thereof.

FIG. 7 A table showing composition of each resin composition of Comparative Examples and a result of characterization thereof.

DETAILED DESCRIPTION

[Configuration of Resin Composition]

Figure 2:
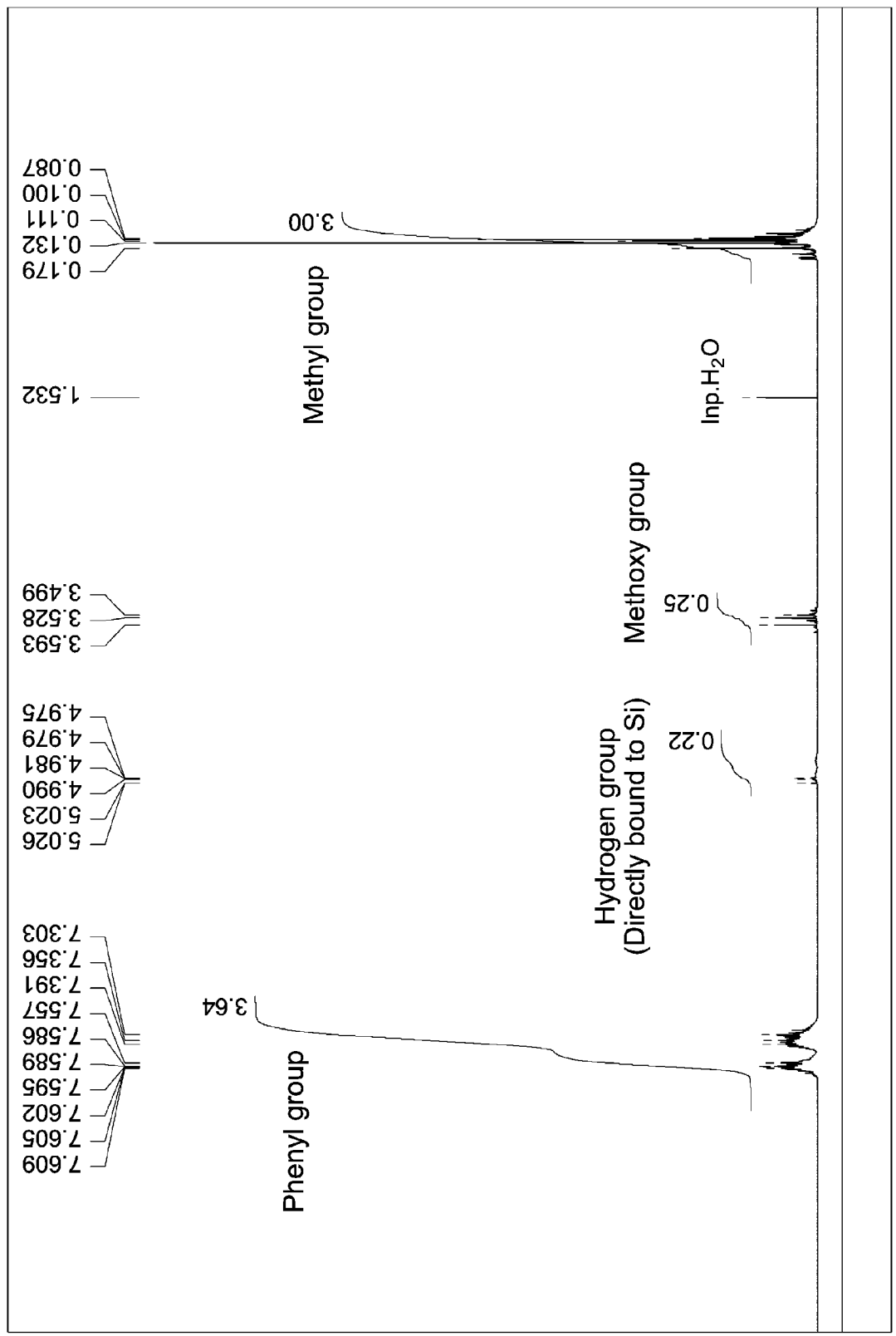
FIG. 2 A NMR chart of E-1 mentioned below, the E-1 being one of the components E to be contained in the resin composition of the embodiment of the present disclosure.

A resin composition according to this embodiment (hereinafter referred to as "resin composition $\alpha$") includes a polycarbonate resin (component A), talc (component B), a sulfonic acid compound (component C) and a drip inhibitor (component D). In addition, as will be described in detail later, the resin composition $\alpha$ can further include another component.

(Component A)

The component A is a polycarbonate resin, which is a main component of the resin composition $\alpha$. Specifically, the content ratio of the component A in the resin composition $\alpha$ may be 77.5% or more and 94.9% or less by weight; and more desirably, it may be 85% or more and 94.9% or less by weight. This is because if the content ratio is less than 77.5% by weight, it would be difficult to uniformly mix the component A with other components and would make it difficult to obtain inherent properties of the polycarbonate resin (impact resistance, tensile elongation at break, etc.). On the other hand, this is also because if the content ratio of the component A exceeds 94.9% by weight, the content ratios of other components (components B to D, etc.) might not be enough.

Examples of the polycarbonate resins that can be used as the component A include an aromatic polycarbonate produced by a reaction of a dihydric phenol with a carbonate precursor. Examples of reaction methods include interfacial polymerization; melt transesterification; solid-phase transesterification of a carbonate prepolymer; ring opening polymerization of a cyclic carbonate compound; and the like. The dihydric phenol and the carbonate precursor as feedstock are not especially limited, and various ones can be used.

Among polycarbonate resins that can be used as the compound A, a polycarbonate resin having 36000 or more and 58000 or less of weight-average molecular weight in polystyrene equivalent may be suitable. The weight-average molecular weight in polystyrene equivalent may be obtained through GPC (Gel Permeation Chromatography) measurement using chloroform solvent, with a polystyrene molecular weight standard substance as a reference. If the weight-average molecular weight exceeds 58000, it might become difficult to mold a thin-walled molded product because fluidity at melting of the resin composition $\alpha$ would become poor and the molding processability would be lowered. On the other hand, if the weight-average molecular weight is less than 36000, it might become more prone to solvent cracking (cracking by chemicals) because solvent resistance of the resin composition $\alpha$ would be lowered; or, it might lead to a drop in impact resistance of the resin composition $\alpha$.

Alternatively, the component A may be one in which a plurality of species of polycarbonate resins with different molecular weights are mixed together. In this case, the weight-average molecular weight of the component A in polystyrene equivalent may be the arithmetic average of the weight-average molecular weights in polystyrene equivalent, of the respective polycarbonate resins which are mixed.

The polycarbonate resin as the compound A may be a freshly prepared virgin material, or may be a recycled material made from waste materials, offcuts, sprues and scraps. For example, it is possible to prepare the polycarbonate resin by using optical discs such as digital versatile discs (DVDs), compact discs (CDs), MOs, MDs, blue-ray discs (BDs); lenses; water bottles; building materials; head lamps; and mixtures thereof, as raw materials. In cases where optical discs are recycled, there may be various secondary materials (impurities) such as metal reflective layers, plating layers, recording material layers, adhesive layers, and labels included therein. Such optical discs may be used in a state including these secondary materials, or may be used after undergoing a known process for separating and removing such secondary materials.

Specific examples of the secondary materials that may come with the optical discs include, but are not limited to, metal reflective layers such as Al, Au, Ag and Si; organic dyes including cyanine dyes; recording material layers such as Te, Se, S, Ge, In, Sb, Fe, Tb, Co, Ag, Ce, Bi; adhesive layers including at least one species of acrylic-based acrylate, ether-based acrylate and vinyl-based monomer, oligomer and polymer; label ink layers in which a polymerization initiator, a pigment and an auxiliary agent are mixed with at least one of UV-curable monomer, oligomer and polymer; and the like. The examples of the secondary materials may also include film-forming materials and coating materials which may be commonly used in optical discs.

In addition, from the viewpoint of recycling, since it is desirable that the cost of the raw materials is low, the re-use of the polycarbonate resin in the state where the various secondary materials are contained may be suitable. However, in order to meet the required properties and desired color of the polycarbonate resin, the optical discs from which the above-mentioned coating film has been removed by chemical treatment, physical (polishing) treatment or the like may be used. For example, finely crushed optical discs itself, finely crushed optical discs after peeling off the film by chemical treatment or pellets of such finely crushed products, may be used as is, or may be kneaded and melted with a given additive, to be made into pellets and be used as polycarbonate resin feedstock.

Alternatively, with some structure of the injection molding machine, it is also possible to directly put the optical discs into a hopper or the like of the injection molding machine, together with a variety of additives which will be described later. Thus, the molded object made of the resin composition α may be obtained. It should be noted that in cases where the polycarbonate resin as the component A to be used is one in a state where the above impurities are not included, the attached matters such as metal reflective layers, recording material layers, adhesive layers, surface hardening layers and labels may be removed by physical (mechanical) or chemical methods which are suggested by, for example, Japanese Patent Application Laid-open Nos. Hei 6-223416, Hei 10-269634, Hei 10-249315, and the like.

(Component B)

The component B is talc (talc: talcum powder), and it gives flame retardant properties and mechanical strength to the resin composition α. The talc is a natural mineral made of magnesium hydroxide and silicate, which is widely used as an additive to a polycarbonate resin as it is not so expensive. Although component ratios and colors of the talc may somewhat vary depending on areas of production, those of various grades with different degree of pulverization are sold by each company.

The degree of pulverization of the talc can be specified by its average median diameter. The average median diameter is a particle diameter in cases where particle size distribution is determined as cumulative percentage with respect to a particle diameter scale, and where the cumulative percentage of the obtained particle size distribution curve reaches 50%. The average median diameter may also be called "50% particle diameter". The average median diameter is able to be measured by a laser diffraction type or scattering type particle size distribution measuring apparatus.

Now, in this embodiment, talc having an average median diameter of 4.6 µm or more and 6.0 µm or less is used as the component B. If the average median diameter of the talc is less than 4.6 µm, fluidity of the resin composition to which the talc is added would be increased too much, and it might result in an occurrence of dripping (melt dripping) when it is burnt. Besides, if the average median diameter of the talc exceeds 6.0 µm, flexural strength of the resin composition to which the talc is added would be decreased, due to that the dispersibility in kneading would become poor, or the like. As a result, cracking and breaking may occur when the resulting resin molded product is bent (see Examples). Therefore, the talc having the average median diameter of 4.6 µm or more and 6.0 µm or less may be suitable as the component B.

The content of the component B in the resin composition α may desirably be 5% or more and 20% or less by weight; and more desirably, it may be 5% or more and 18% or less by weight. If the content is less than 5% by weight, it would be difficult to obtain an effect of enhancing stiffness and flame retardant properties when the resin composition is molded into a thin-walled resin molded product. On the other hand, if the content exceeds 20% by weight, there would be a problem such as that the talc may slip at a feeding part of an extruding machine when molding the resin composition. This might lead to such problems that kneading at a desired ratio of raw materials would become difficult; fluidity of the melted resin composition at injection molding would be lowered; and the resin composition would lack mechanical strength.

(Component C)

The component C is a sulfonic acid compound, and it adds flame retardant properties to the resin composition α. The sulfonic acid compound which serves as the component C is an organic sulfonic acid or an organic sulfonic acid metal salt. Either one of an organic sulfonic acid and an organic sulfonic acid metal salt may be used as the component C; or, both an organic sulfonic acid and a metal salt thereof may be used together as the component C to be contained in the resin composition α.

Either low-molecular-weight or high-molecular-weight organic sulfonic acids can be used as the organic sulfonic acid. Examples of low-molecular-weight organic sulfonic acids include perfluoroalkanesulfonic acid (perfluorobutanesulfonic acid), dialkylsulfone sulfonic acid (diphenylsulfone sulfonic acid), alkylbenzene sulfonic acid, halogenated alkylbenzene sulfonic acid, alkyl sulfonic acid, naphthalene sulfonic acid, and the like.

Examples of high-molecular-weight organic sulfonic acids that can be used include a sulfonic acid-based polymer which is a polymer having an aromatic ring and containing a sulfonic acid functional group. Examples of the polymers having an aromatic ring include polystyrene (PS), high-impact polystyrene (HIPS) and styrene-acrylonitrile copolymer resin (AS). In addition to these, there are also other sulfonic acid-based polymers that can be used, including those disclosed by Japanese Patent Nos. 4196862 and 4196861.

As the organic sulfonic acid metal salt, alkali metal salts and alkaline earth metal salts of the above-described low-molecular-weight organic sulfonic acids and high-molecular-weight organic sulfonic acids may be used. The component C may be one or a plurality of members selected from those organic sulfonic acids and organic sulfonic acid metal salts.

Although there are various organic sulfonic acids and organic sulfonic acid metal salts, from low-molecular-weight ones to high-molecular-weight ones, it is usually more desirable to use high-molecular-weight ones because they have good preservation stability under high-temperature and high-humidity conditions. Among them, a core/shell-structure styrene-based polymer in which sulfonic acid functional groups are bound to the particle surface part, an alkali metal salt thereof and an alkaline earth metal salt thereof may be more desirable. Specifically, polystyrene sulfonic acid and potassium salt thereof are able to give high flame retardant properties, with a very small amount of addition. In cases where the component C is a high-molecular-weight sulfonic acid compound, it may be more desirable if the weight-average molecular weight (in polystyrene equivalent) of the component C is 40000 or more and 300000 or less, because this would enable to keep the balance between solvent resistance and compatibility.

The content ratio of the component C in the resin composition α may desirably be 0.05% or more and 2.0% or less by weight. If the content ratio is less than 0.05% by weight, the flame retardant properties of the resin composition α become insufficient. If the content ratio exceeds 2.0% by weight, the compatibility with the polycarbonate resin (component A) would be lowered; which might result in a negative effect on flame retardant properties, that is, an effect that the flame retardant properties would become even lower than when the component C is not included. In addition, among the above-described range of the content ratio, a range of 0.05% or more and 1.0% or less by weight may be especially desirable because this may enhance the flame retardant properties of the resin composition α.

(Component D)

The component D is a drip inhibitor, which is a component to inhibit dripping (melt dripping) that might occur when the resin composition α is burnt. The drip inhibitor which serves as the component D may be a fluorinated polymer; and among the fluorinated polymers, fluorinated polyolefins may be suitable. Specific examples of such fluorinated polyolefins include difluoroethylene polymers, polytetrafluoroethylene, tetrafluoroethylene-hexafluoropropylene copolymers, copolymers of trafluoroethylene and ethylenic monomers, and the like. These may be used alone or in admixture of a plurality of such compounds. By using an admixture of the fluorinated polyolefins having different degrees of polymerization, handling of the fluorinated polyolefins as a raw material may be improved, with an effect such as that agglomeration can be prevented.

Among the above-mentioned fluorinated polyolefins, a polytetrafluoroethylene having fibril-forming abilities may be suitable for the component D. It may have an average molecular weight of 50000 or more; and one with an average molecular weight of 100000 or more and 20000000 or less may be especially desirable.

The content ratio of the component D in the resin composition α may desirably be 0.05% or more and 1.0% or less by weight. This is because if the content ratio is less than 0.05% by weight, the effect of inhibiting dripping may be small; and if the content ratio exceeds 1.0% by weight, the effect of inhibiting dripping would be saturated and the cost becomes relatively high, while mechanical strength and fluidity of the resin composition becomes too low. In addition, among the above-described range of the content ratio, 0.05% or more and 0.8% or less by weight may be especially desirable.

The resin composition α, as described above, may contain the component A, the component B, the component C and the component D. As will be exemplified later by Examples, such a resin composition α has high flame retardant properties, as well as moldability, durability, strength and chemical stability; and it would be suitable for the use as manufactured products. In addition, the resin composition α substantially does not contain halogen elements, and this would have less impact on environment.

(Component E)

The resin composition α may further include another component in addition to the above-described components A to D. Specifically, the resin composition α may include a silicone compound (component E) which satisfies a prescribed condition.

The component E adds flame retardant properties to the resin composition α, together with the component B. Specific examples of the silicone compounds that can be used as the component E include polyorganosiloxanes (silicone, organic silicates, etc.). Examples of polyorganosiloxanes include poly(phenylmethyl-methoxy-hydrogen)siloxane, poly(phenylmethyl)siloxane, poly(phenyl-hydrogen)siloxane, poly(methylethyl)siloxane, poly(dimethyl)siloxane, poly(diphethyl)siloxane, poly(diethyl)siloxane and poly(ethylphenyl)siloxane.

In addition, specific examples of polyorganosiloxanes further include copolymers of a plurality of siloxane units such as dimethylsiloxane, methylethylsiloxane, phenylmethylsiloxane, diphenylsiloxane, diethylsiloxane, ethylphenylsiloxane, methyl-hydrogensiloxane, phenyl-hydrogensiloxane, phenyl-methoxysiloxane and methyl-methoxysiloxane; and mixtures thereof.

Examples of functional groups (substituents) that bind to siloxane units to make up such polyorganosiloxanes include a hydrogen group, an aromatic group, an alkyl group, an alkoxy group, a hydroxyl group, an amino group, a carboxyl group, a silanol group, a mercapto group, an epoxy group, a vinyl group, an aryloxy group, a polyoxyalkylene group, a vinyl group and the like. Among them, the aromatic group, the hydrogen group, the alkyl group, the alkoxy group, the hydroxyl group, the vinyl group or and the epoxy group may be suitable for the silicone compound which serves as the component E. A phenyl group, the hydrogen group and a methyl group may be especially desirable. The form of the polyorganosiloxanes may be any of, for example, forms of oil, varnish, gum, powder and pellet.

Among the above-described silicone compounds, the silicone compound which serves as the component E is one in which the proportion of hydrogen atoms in each functional group in the silicone compound is in a specific range. Specifically, the silicone compound which serves as the component E can be specified by the proportions of the hydrogen atoms in phenyl groups (Ph—H), the hydrogen atoms in hydrogen groups (Si—H), and/or the hydrogen atoms in methyl groups (Me—H).

The silicone compound which serves as the component E may be a silicone compound in which the proportion of the hydrogen atoms in phenyl groups is 51% or more. Among such silicone compounds, those in which the proportion of the hydrogen atoms in phenyl groups is 51% or more and the proportion of the hydrogen atoms in methyl groups is 29% or more may be suitable. Further, among these silicone compounds, those in which the proportion of the hydrogen atoms in phenyl groups is 51% or more and 71% or less and in which the proportion of the hydrogen atoms in methyl groups is 29% or more and 49% or less may be even more suitable.

In another way, the silicone compound which serves as the component E may be a silicone compound in which the proportion of the hydrogen atoms in hydrogen groups is 22% or more. Among such silicone compounds, those in which the proportion of the hydrogen atoms in hydrogen groups is 22% or more and the proportion of the hydrogen atoms in methyl groups is 50% or more may be suitable. Further, among these silicone compounds, those in which the proportion of the hydrogen atoms in hydrogen groups is 22% or more and 50% or less and in which the proportion of the hydrogen atoms in methyl groups is 50% or more and 78% or less may be even more suitable.

As describe above, the resin composition α includes the sulfonic acid compound (component C) and the silicone compound (component E) for the purpose of adding flame retardant properties to the resin composition α. However, by including both the sulfonic acid compound and silicone compound, there are some cases where flame retardant properties of the resin composition would drop compared to cases where only one of these compounds was included alone. In response to this, by using a silicone compound in which the proportion of hydrogen atoms in the specific functional groups in the silicone compound is in the predetermined range, in such a way as the component E according to this embodiment, it would be possible to prevent such a drop in flame retardant properties. Thus, it becomes possible to reduce the content of the component B and that of the component E to the extreme limit.

FIG. 1 is a table showing the proportion of hydrogen atoms in each functional group, in each of silicone compounds to be used in Examples which will be described later. Among the silicone compounds listed in this table, in E-1 and E-2, the proportion of the hydrogen atoms in phenyl groups is 51% or more. In E-3. the proportion of the hydrogen atoms in hydrogen groups is 22% or more. Accordingly, E-1 to E-3 would be the component E of this embodiment. E-4 to E-8 do not satisfy these conditions, so they are not the component E of this embodiment.

In addition, among E-1 to E-3, the silicone compounds in which the proportion of the hydrogen atoms in phenyl groups is 51% or more and the proportion of the hydrogen atoms in methyl groups is 29% or more are E-1 and E-2. In E-1 and E-2, the proportion of the hydrogen atoms in phenyl groups is 51% or more and 71% or less, and the proportion of the hydrogen atoms in methyl groups is 29% or more and 49% or less. Further, among E-1 to E-3, the silicone compound in which the proportion of the hydrogen atoms in hydrogen groups is 22% or more and in which the proportion of the hydrogen atoms in methyl groups is 50% or more is E-3. In E-3. the proportion of the hydrogen atoms in hydrogen groups is 22% or more and 50% or less, and the proportion of the hydrogen atoms in methyl groups is 50% or more and 78% or less. Note that the silicone compounds shown in this table are merely examples, so any silicone compound which is not contained in this table but which satisfies the above-described conditions would be encompassed in the component E of this embodiment.

Which functional group the hydrogen atoms contained in the silicone compound are contained in can be specified by analyzing the silicone compound with proton nuclear magnetic resonance spectral method (1H NMR). Specifically, the silicone compound as a target to be analyzed may be dissolved in deuterated chloroform, and then NMR measurement may be carried out, to obtain a NMR chart. FIG. 2 is an example of the NMR chart of the above-mentioned E-1.

Where the hydrogen atoms belong can be determined using the fact that a shift amount of a chemical shift ($\delta$) of a peak in the NMR chart differs depending on chemical environment of the hydrogen atom. The chemical shift is a difference between the measured sample and a case in which a shielding constant of the methyl groups of the tetramethylsilane (TMS) is used as a reference, expressed in terms of parts per million (ppm). For example, in cases where an electromagnetic wave of 500 MHz is applied, 1 ppm will correspond to 500 Hz.

The proportion of the hydrogen atoms in each functional group can be determined by dividing a value of integral of the hydrogen atoms belonging to each functional group with a value of integral of all the hydrogen atoms. FIG. 2 shows the integral of the hydrogen atoms belonging to each functional group. The proportion of hydrogen atoms in each functional group in each of silicone compounds as shown in FIG. 1 is able to be determined by such a technique.

The content ratio of the component E in the resin composition α may desirably be 0.1% or more and 2.0% or less by weight. This is because if the content ratio is less than 0.1% or exceeding 2.0% by weight, the effect of enhancing flame retardant properties may be small (see Examples).

(Other Components)

The resin composition α can also contain still other components in addition to or instead of the component E. Specifically, the resin composition α may further contain an antioxidant (hindered phenol, phosphorous or sulfur antioxidant); an antistatic agent, an ultraviolet absorber (benzophenone, benzotriazole, hydroxyphenyl triazine, cyclic iminoester or cyanoacrylate UV absorber); a photostabilizer; a plasticizer; a compatibilizer; a colorant (pigment or dye); a light diffusing agent; a light stabilizer; a crystal nucleating agent; an antimicrobial agent; a fluidity modifier; an infrared absorber, a fluorescent material, an anti-hydrolysis agent, a mold release agent; a silicone-based surface treatment agent; or the like. This may enhance the properties such as injection moldability, impact resistance, appearance, heat resistance, weather resistance, color and stiffness.

[Method for Production of Resin Composition]

The resin composition α may be produced in the following manner. First, the components (the components A, B, C and D; and the component E and various additives as needed) are mixed. Mixing may be performed with the use of, for example, a Henschel mixer or a tumbler. At this time, the components are mixed in such a manner that each component would be uniformly diffused. After that, a strand would be obtained when the mixture is melted and kneaded by a single-screw or twin-screw extruder or the like; and the strand is cut by a pelletizer, to form pellets.

The resin composition α may thus be produced as described above. Note that the form of the resin composition α is not limited to the processed form of pellets. The possible forms also include a state where the components are mixed together (powdery state or fluid state), and the processed form different from pellets (sheet-like, etc.).

[Resin Molded Object]

The resin composition α is able to be molded into various manufactured products. Specifically, it may be possible to form casings, parts, and other components of various products such as electric appliances, auto parts, information equipment, business equipment, telephone sets, stationeries, furniture and textile made of the resin composition α. As described above, a resin molded object made of the resin composition α would have high flame retardant properties, moldability, durability, strength and chemical stability; and it may also be suitable for thinning.

The resin molded object made of the resin composition α may be molded by subjecting the above-described resin composition α in the form of pellets to a method using any of a variety of molding methods such as injection molding, injection compression molding, extrusion molding, blow molding, vacuum forming, press molding, foam molding and supercritical molding.

The present disclosure is not limited to the aforementioned embodiment, and various modifications are available within the scope without departing from the gist of the present disclosure.

EXAMPLES

Resin compositions of Examples of the present disclosure (resin compositions α) and resin compositions of Comparative Examples were prepared; and characterization of each of the resin compositions was carried out. FIGS. 3 to 5 are tables showing the composition (percentages by weight) of each resin composition of Examples and a result of characterization thereof. FIGS. 6 and 7 are tables showing the composition (percentages by weight) of each resin composition of Comparative Examples and a result of characterization thereof.

[Composition of Resin Compositions of Examples and Comparative Examples]

Each component included in the resin compositions of Examples and Comparative Examples will be described. Note that each component (components A, B, C, D and E) corresponds to each of the components described in the above-described embodiment.

(Component A: Polycarbonate Resin)

A-1: A commercial middle-molecular weight polycarbonate resin (L-1225L: produced by Teijin Chemicals Ltd.; with weight-average molecular weight in polystyrene equivalent (hereinafter referred to as Mw in PS equivalent) of 45000)

A-2: A commercial low-molecular weight polycarbonate resin (L-1225LLL: produced by Teijin Chemicals Ltd.; with Mw in PS equivalent of 33000)

A-3: A polycarbonate resin obtained by coarsely crushing used sheets of building material; melting and kneading the resultant material with the use of a twin-screw extruder; and then making it into pellets (Mw in PS equivalent: 46000)

A-4: A PC resin recovered from used water-containers colored in light-green (Mw in PS equivalent: 56000)

A-5: A polycarbonate resin obtained by subjecting used CDs (Compact Discs) to crushing processing (2 to 20 mm); treating them in a hot alkaline aqueous solution to remove coating films (recording material layers, labels, adhesive layers, hardening layers, metal reflective layers, etc.) therefrom; subsequently melting and kneading the resultant material with the use of a twin-screw extruder; and then making it into pellets (Mw in PS equivalent: 32000)

A-6: A PC resin recovered from used water-containers colored in light-blue (Mw in PS equivalent: 61000)

A-7: A polycarbonate resin obtained by subjecting used DVDs (Digital Versatile Discs) to crushing processing (2 to 20 mm); treating them in a hot alkaline aqueous solution to remove coating films (recording material layers, labels, adhesive layers, hardening layers, metal reflective layers, etc.) therefrom; subsequently melting and kneading the resultant material with the use of a twin-screw extruder; and then making it into pellets (Mw in PS equivalent: 30000)

(Component B: Talc)

B-1: A commercial talc product in ultrafine particle grade (average median diameter: 4.2 µm; specific surface area: 45000 cm$^2$/g or more) (LMS-400: produced by Fuji Talc Industrial Co., Ltd.)

B-2: A commercial talc product in fine particle grade (average median diameter: 4.6 µm; specific surface area: 45000 cm$^2$/g or more) (LMS-300: produced by Fuji Talc Industrial Co., Ltd.)

B-3: A commercial talc product in fine particle grade (average median diameter: 5.0 µm; specific surface area: 40000-45000 cm$^2$/g) (LMS-200: produced by Fuji Talc Industrial Co., Ltd.)

B-4: A commercial talc product in fine particle grade (average median diameter: 6.0 µm; specific surface area: 33000-38000 cm$^2$/g) (LMS-100: produced by Fuji Talc Industrial Co., Ltd.)

B-5: A commercial talc product in middle particle grade (average median diameter: 13 µm; specific surface area: 18000-21000 cm$^2$/g) (PKP-80: produced by Fuji Talc Industrial Co., Ltd.)

(Component C: Sulfonic Acid Compound)

C-1: A product in which sulfonic acid potassium salt was introduced to the surface part of polystyrene (PSS-K: produced by Sony Chemical & Information Device Corporation)

C-2: Potassium per-butane sulfonate (Chemguard-411: produced by Sun Chemical Corporation)

(Component D: Drip Inhibitor)

D-1: A commercial PTFE as a polytetrafluoroethylene having fibril-forming abilities (Polyflon FA500H: produced by Daikin Industries, Ltd.)

(Component E: Silicone Compound; See FIG. 1)

E-1: Phenyl/methyl/methoxy/hydrogen type liquid silicone oligomer

E-2: Phenyl/methyl type solid silicone oligomer

E-3: Methyl/hydrogen type liquid silicone oligomer (Common Flame Retardant PC/ABS Alloy (Comparative Examples))

TF-7100F: flame retardant PC/ABS alloy, produced by Teijin Chemicals Ltd.

[Molding of Resin Composition and Series of Measurements]

The components were blended each at the corresponding compound ratio described in FIGS. 3 to 7, followed by blending in a tumbler, and then the resultant mixture was melted and kneaded with the use of a same-direction rotation type twin-screw extruder (produced by Toyo Seiki Seisakusho Ltd.: Labo Plastomill, using a twin screw extrusion unit) to obtain pellets. The conditions for extrusion are discharge of 4 kg/h; screw speed of 48 rpm; and extrusion temperature of a part from a first supply port to a die was 270° C. After drying the obtained pellets by a hot air circulation drying machine at 120° C. for 8 hours, the resultant material was molded with the use of an injection molding machine at a cylinder temperature of 290° C. and die temperature of 70° C., to obtain a test piece for measurement of flame retardant properties and a palm rest for a notebook computer (to be used for checking thin-wall moldability; thickness: 1.0 mm).

Each characterization was carried out in the following manner.

(Flame Retardant Properties)

Vertical flame test according to the standard of UL94 was carried out for the test pieces having the thickness of 1.0 mm, and their grades were characterized. This standard provides the grades (levels) such as "V-2", "V-1" and "V-0"; in which, V-1 indicates higher flame retardant properties than those of V-2, and V-0 indicates higher flame retardant properties than those of V-1. Furthermore, the cases where the flame retardant properties do not reach those of V-2 would be described as "V-failed". In this measurement, "V-1" and "V-0" were determined as "good".

(Moldability)

Molding was performed using a die for the palm rest for a notebook computer (thickness: 1.0 mm); and appearance (state of shrinkage cavity and weldline) was checked to see whether or not the product can be molded. Further, strength of a welded portion, and strength of boss portion with 10-time repetition of screwing were characterized; and it was determined whether or not it was a practical level.

(Flexural Modulus)

A measurement for test pieces having the thickness of 2.0 mm was carried out according to ASTM D790. A value of 2900 MPa or more was determined to be sufficient as high stiffness.

(Durability)

The obtained molded objects were characterized by retention of the weight-average molecular weight (with respect to the weight-average molecular weight of the pellets before molding) when deterioration of the molded objects was accelerated by being allowed to stand for two weeks under high-temperature and high-humidity conditions of 85° C. and 80% RH. The retention of 95% or more was determined as "good".

(Overall Determination)

Regarding the flame retardant properties, moldability, flexural modulus and high durability that were characterized as described above; if all of them were good, the overall determination was "good". If any of them had a defective part, the overall determination was "failed".

[Results of Characterization of Examples and Comparative Examples]

As shown in FIGS. 3 to 5, the resin compositions of Examples showed good results by all endpoints. However, as shown in FIGS. 6 and 7, the resin compositions of Comparative Examples showed the following results.

Comparative Example 1

As a result of the durability test, the retention of weight-average molecular weight in polystyrene equivalent was as low as 80%.

Comparative Example 2

The molecular weight (weight-average molecular weight in polystyrene equivalent or the arithmetic average thereof; the same shall apply hereinafter) of the component A (polycarbonate resin) was so low that in the test of flame retardant properties, there was an occurrence of dripping and it resulted in "V-failed". In addition, there was a case where the obtained palm rest had a protrusion and caused a crack.

Comparative Example 3

The molecular weight of the component A was so low that in the test of flame retardant properties, there was an occurrence of dripping and it resulted in "V-failed". In addition, there was a case where the obtained palm rest had a protrusion and caused a crack.

Comparative Example 4

The molecular weight of the component A was so high that it caused a short shot (filling insufficiency) and the thin-wall molded product was not obtained.

Comparative Example 5

As there was no addition of the component B (talc), the value of flexural modulus was insufficient (compared to Example 1).

Comparative Example 6

As the added amount of the component B was too small, the level of flame retardant properties was lowered. Further, there was no addition of the component E, so the level of flame retardant properties was insufficient (compared to Example 1).

Comparative Example 7

As the added amount of the component B was too small, the value of flexural modulus was insufficient (compared to Example 1).

Comparative Example 8

As the added amount of the component B was too large, the compound with the desired composition was not obtained.

Comparative Example 9

As the average median diameter of the component B was too small, the fluidity became high and it resulted in an occurrence of dripping during the test of flame retardant properties.

Comparative Example 10

As the average median diameter of the component B was small and the added amount of the component B was large, the fluidity increased to a considerable extent; and it resulted in "V-failed" during the test of flame retardant properties.

Comparative Example 11

As the average median diameter of the component B was too large, there was an occurrence of crack in the welded portion.

Comparative Example 12

As the average median diameter of the component B was large and the added amount of the component B was large, there was an occurrence of crack in the welded portion and boss breakage.

Comparative Example 13

As the added amount of the component B was too large, the compound with the desired composition was not obtained.

Comparative Example 14

As the added amount of the component B was too large, the compound with the desired composition was not obtained.

Comparative Example 15

As the added amount of the component C (sulfonic acid compound) was too small, the level of flame retardant properties was lowered (compared to Example 1).

Comparative Example 16

As the added amount of the component C was too large, the level of flame retardant properties was lowered, and there was a generation of gas at the time of molding (compared to Example 1).

[Study of Examples and Comparative Examples]
(Regarding Component A)

The weight-average molecular weight of the polycarbonate resin which serves as the component A, in polystyrene equivalent, of 33000 (Comparative Example 2) was so low that it resulted in an occurrence of dripping. The weight-average molecular weight of 61000 (Comparative Example 4) was so high that the moldability became lower. Therefore, a suitable weight-average molecular weight of the polycarbonate resin as the component A, in polystyrene equivalent, may be 36000 (Examples 5, 17 to 19) or more and 58000 (Example 6) or less.

(Regarding Component B)

A suitable average median diameter of the talc which serves as the component B may be 4.6 μm or more and 6.0 μm or less (B-2, B-3 and B-4) as shown by Examples 1 to 19. This is because if the average median diameter was 4.2 μm (B-1) or less, it would be difficult to obtain sufficient flame retardant properties (Comparative Examples 9 and 10); and if it was 13 μm (B-5) or more, it would lead to problems in moldability (Comparative Examples 11 and 12). Note that, in some Comparative Examples, although the talc that satisfies the condition of the above-mentioned average median diameter was used as the component B, the overall determination was "failed", due to the added amount of the component B or other components.

The content of the talc which serves as the component B of 5% or more and 20% or less by weight may be suitable. This is because if the content was 4% or less by weight, the flexural modulus would be insufficient (Comparative Examples 6 and 7); and if it exceeded 25% by weight, the compound with the desired composition would not be obtained (Comparative Examples 8, 13 and 14).

(Regarding Component C)

The content ratio of the sulfonic acid which serves as the component C of 0.03% by weight was so small that it was not able to obtain sufficient flame retardant properties (Comparative Example 15); and the content ratio of 5% by weight was so large that it was not able to obtain sufficient flame retardant properties (Comparative Example 16). Therefore, the content ratio of the component C of 0.05% (Example 15) or more and 2.0% or less by weight may be suitable.

(Regarding Component D)

The content ratio of the drip inhibitor which serves as the component D of 0.01% by weight was so small that it resulted in an occurrence of dripping; and the content ratio of 1.50% by weight was so large that it was not able to obtain sufficient flame retardant properties. Therefore, the content ratio of the component D of 0.05% or more and 1.00% or less by weight may be suitable.

(Regarding Component E)

As the silicone compound which serves as the component E, the silicone compounds in which the proportion of the hydrogen atoms in phenyl groups is 51% or more and/or the proportion of the hydrogen atoms in hydrogen groups is 22% or more (E-1, E-2 and E-3) may be suitable, as the sufficient flame retardant properties can be obtained.

The content ratio of the component E of 0.05% by weight was so small that it was not able to obtain sufficient flame retardant properties; and the content ratio of 3.00% by weight was so large that it was not able to obtain sufficient flame retardant properties. Therefore, the content ratio of the component E of 0.10% or more and 2.0% or less by weight may be suitable.

(Regarding Resin Compositions)

From the facts described above, the resin compositions that include the polycarbonate resin (component A); the talc (component B) having an average median diameter of 4.6 μm or more and 6.0 μm or less, the content of the talc being 5% or more and 20% or less by weight; the sulfonic acid compound (component C), whose content is 0.05% or more and 2.0% or less by weight; and the drip inhibitor (component D), whose content is 0.05% or more and 1.0% or less by weight; have high flame retardant properties and good practicality. In addition, the above-described resin compositions may include the silicone compound (component E) which satisfies the prescribed condition, the content of the silicone compound being 1% or more and 2.0% or less by weight. The prescribed condition regarding the component E is that the proportion of the hydrogen atoms in phenyl groups is 51% or more; and/or the proportion of the hydrogen atoms in hydrogen groups is 22% or more.

The present disclosure may employ the following configurations.

(1) A resin composition including:
a component A being a polycarbonate resin;
a component B being talc having an average median diameter of 4.6 μm or more and 6.0 μm or less, the content of the component B being 5% or more and 20% or less by weight;
a component C being an organic sulfonic acid or an organic sulfonic acid metal salt, the content of the component C being 0.05% or more and 2.0% or less by weight; and
a component D being a drip inhibitor, the content of the component D being 0.05% or more and 1.0% or less by weight.

(2) The resin composition according to (1), further including
a component E being a silicone compound,
among hydrogen atoms in the silicone compound, the proportion of the hydrogen atoms in phenyl groups being 51% or more and/or the proportion of the hydrogen atoms in hydrogen groups being 22% or more,
the content of the component E being 0.1% or more and 2.0% or less by weight.

(3) The resin composition according to (1) or (2), in which
the component A is a polycarbonate resin having 36000 or more and 58000 or less of weight-average molecular weight in polystyrene equivalent.

(4) The resin composition according to any one of (1) to (3), in which
the component C is a sulfonic acid of a high molecular polymer having an aromatic ring or a sulfonic acid metal salt of a high molecular polymer having an aromatic ring.

(5) The resin composition according to any one of (1) to (4), in which
the component D is a polytetrafluoroethylene having fibril-forming abilities.

(6) A resin composition including:
a component A being a polycarbonate resin;
a component B being talc having an average median diameter of 4.6 μm or more and 6.0 μm or less;
a component C being an organic sulfonic acid or an organic sulfonic acid metal salt; and
a component D being a drip inhibitor.

(7) A resin molded object including:
a component A being a polycarbonate resin;
a component B being talc having an average median diameter of 4.6 μm or more and 6.0 μm or less, the content of the component B being 5% or more and 20% or less by weight;
a component C being an organic sulfonic acid or an organic sulfonic acid metal salt, the content of the component C being 0.05% or more and 2.0% or less by weight; and
a component D being a drip inhibitor, the content of the component D being 0.05% or more and 1.0% or less by weight.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A resin composition consisting of:
a component A consisting of a polycarbonate resin or a mixture of polycarbonate resins;
a component B being talc, the content of the component B being 5% or more and 20% or less by weight;
a component C being an organic sulfonic acid or an organic sulfonic acid metal salt, the content of the component C being 0.05% or more and 2.0% or less by weight;
a component D being a drip inhibitor, the content of the component D being 0.05% or more and 1.0% or less by weight; and
a component E being a silicone compound,
wherein the component A has 36000 or more and 58000 or less of weight-average molecular weight in polystyrene equivalent.

2. The resin composition according to claim 1, wherein the content of the component E is 0.1% or more and 2.0% or less by weight.

3. The resin composition according to claim 1, wherein the component C is a sulfonic acid of a polymer having an aromatic ring or a sulfonic acid metal salt of a polymer having an aromatic ring.

4. The resin composition according to claim 1, wherein the component D is a polytetrafluoroethylene having fibril-forming abilities.

5. A resin composition consisting of:
a component A consisting of a polycarbonate resin or a mixture of polycarbonate resins;
a component B being talc having an average median diameter of 4.6 μm or more and 6.0 μm or less;
a component C being an organic sulfonic acid or an organic sulfonic acid metal salt; and
a component D being a drip inhibitor,
wherein the component A has 36000 or more and 58000 or less of weight-average molecular weight in polystyrene equivalent.

6. A resin molded object comprising a resin composition that consists of:
a component A consisting of a polycarbonate resin or a mixture of polycarbonate resins;
a component B being talc, the content of the component B being 5% or more and 20% or less by weight;
a component C being an organic sulfonic acid or an organic sulfonic acid metal salt, the content of the component C being 0.05% or more and 2.0% or less by weight;
a component D being a drip inhibitor, the content of the component D being 0.05% or more and 1.0% or less by weight; and
a component E being a silicone compound,
wherein the component A has 36000 or more and 58000 or less of weight-average molecular weight in polystyrene equivalent.

7. The resin composition according to claim 1, wherein among hydrogen atoms in the silicon compound:
a proportion of the hydrogen atoms in the methyl groups ranges from 50% or more to 78% or less; and
a proportion of the hydrogen atoms that are bonded directly to silicon ranges from 22% or more to 50% or less.

8. The resin composition according to claim 1, wherein among hydrogen atoms in the silicon compound:
a proportion of the hydrogen atoms in phenyl groups is 51% or more; and
a proportion of the hydrogen atoms is methyl groups is 29% or more.

9. The resin molded object according to claim 1, wherein among hydrogen atoms in the silicon compound:
a proportion of the hydrogen atoms in phenyl groups is 50% or more; and
a proportion of the hydrogen atoms that are bonded directly to silicon is 22% or more.

* * * * *